(12) United States Patent
Walker, Jr.

(10) Patent No.: US 6,726,738 B1
(45) Date of Patent: Apr. 27, 2004

(54) AIR FILTER ASSEMBLY

(76) Inventor: Robert A. Walker, Jr., 26954 White Horse Pl., Santa Clara, CA (US) 91351

( * ) Notice: Subject to any disclaimer, the term of this patent is extended or adjusted under 35 U.S.C. 154(b) by 0 days.

(21) Appl. No.: 10/264,882

(22) Filed: Oct. 4, 2002

(51) Int. Cl.⁷ .............................................. B01D 35/02
(52) U.S. Cl. ...................... 55/385.3; 55/502; 55/505; 96/383; 96/387; 96/422; 123/198 E
(58) Field of Search ...................... 55/502–507, 385.3, 55/DIG. 19; 96/381, 383, 387, 417, 422; 123/198 E

(56) References Cited

U.S. PATENT DOCUMENTS

| | | | |
|---|---|---|---|
| 2,126,643 A | * 8/1938 | Kamrath | 55/510 |
| 2,217,830 A | * 10/1940 | Baillio | 96/339 |
| 2,385,814 A | 10/1945 | Kamrath | |
| 2,815,825 A | * 12/1957 | Dreznes | 96/383 |
| 2,886,121 A | * 5/1959 | Welbourn | 181/225 |
| 2,904,129 A | * 9/1959 | McMichael | 96/383 |
| 3,462,949 A | * 8/1969 | Anderson et al. | 60/796 |
| 3,614,859 A | 10/1971 | Clark | |
| 4,653,457 A | 3/1987 | Stege | |
| 4,861,359 A | 8/1989 | Tettman | |
| 5,106,397 A | * 4/1992 | Jaroszczyk et al. | 96/388 |
| 5,479,907 A | 1/1996 | Walker, Jr. | |
| 6,009,846 A | 1/2000 | Walker, Jr. | |
| 6,599,342 B2 | * 7/2003 | Andress et al. | 55/495 |

FOREIGN PATENT DOCUMENTS

| | | | | |
|---|---|---|---|---|
| JP | 55-156245 | * 12/1980 | | 96/383 |
| JP | 60-183229 | * 9/1985 | | 96/383 |

* cited by examiner

*Primary Examiner*—Richard L. Chiesa
(74) *Attorney, Agent, or Firm*—Christie, Parker & Hale, LLP

(57) ABSTRACT

Air filter assemblies include an air filter housing with an air flow passageway extending therethrough, and a connection flange to facilitate attachment with an air filter member. The air filter member includes an annular air filter element disposed concentrically around the housing. The filter member has a closed top at one end and a retaining band at an opposite end that includes a connection base that is configured to attach with the housing connection flange. An attachment assembly is positioned over the housing connection flange and air filter member connection base to releasibly attach the air filter member to the air filter housing. An O-ring seal is interposed between the air filter housing and member to provide a leak-tight fit therebetween. A sound attenuating chamber is disposed within the assembly to control unwanted intake air noise therein. A vacuum monitor can be attached to the assembly to assess the remaining service life of the air filter element without need for visual inspection.

22 Claims, 4 Drawing Sheets

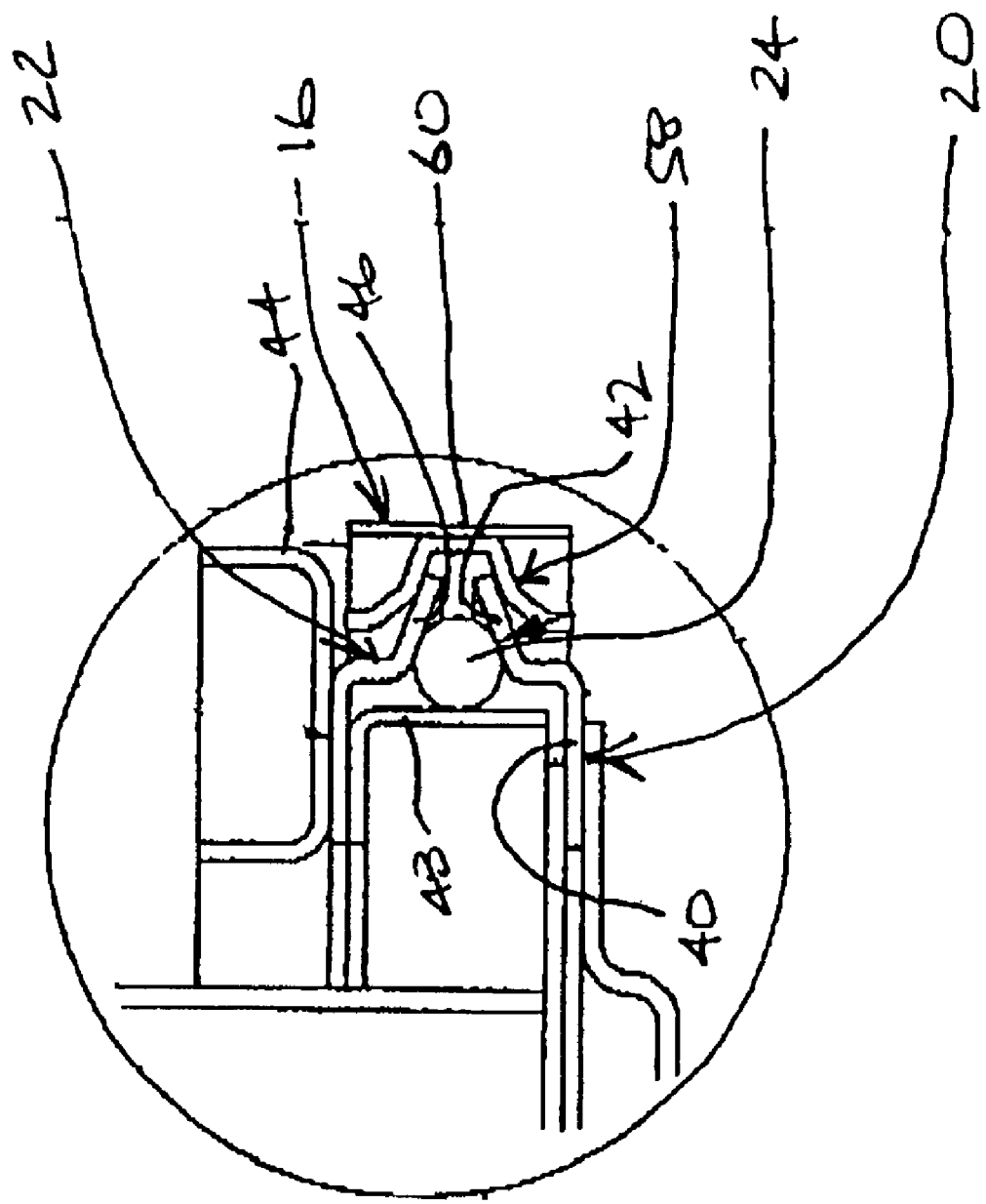

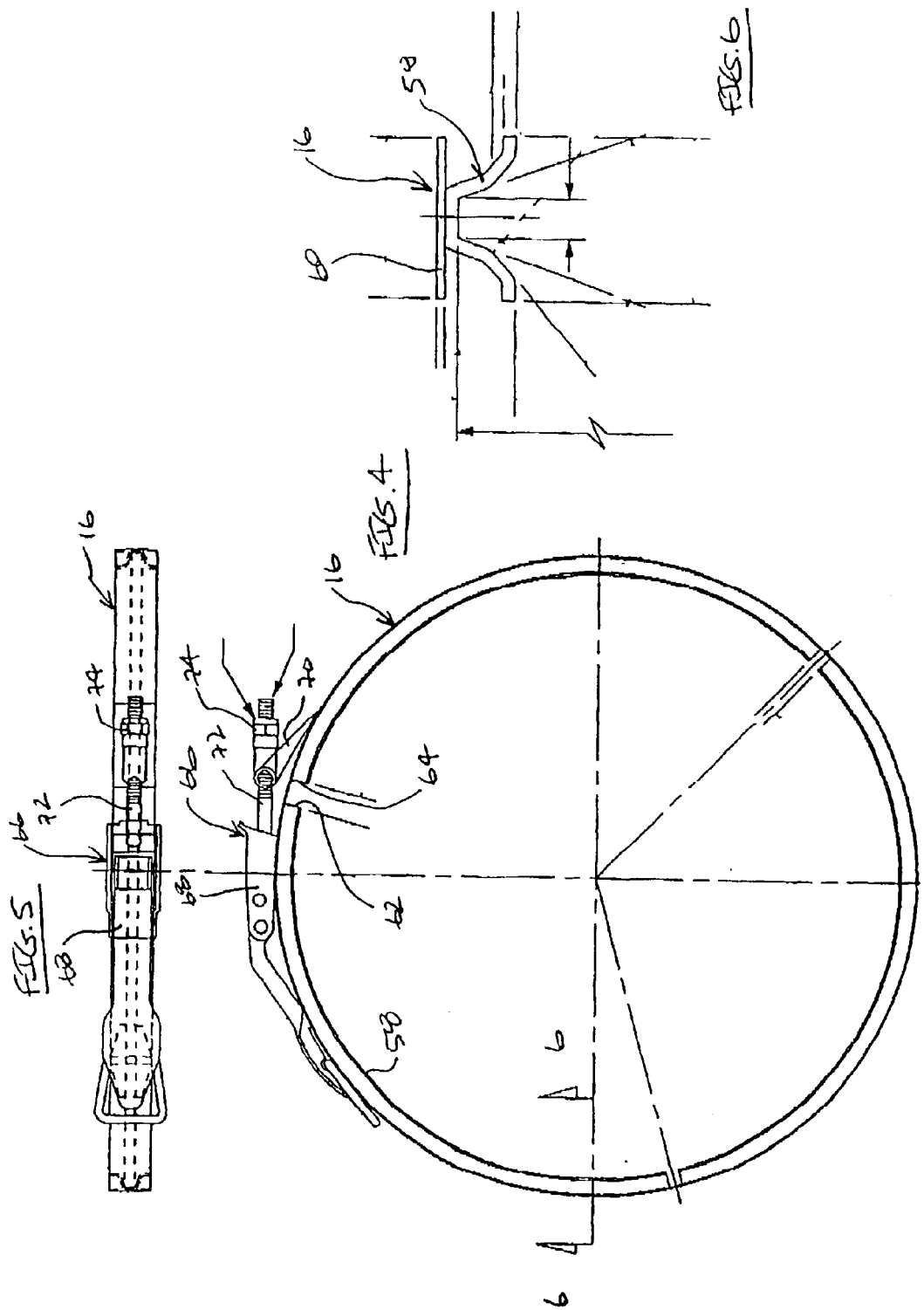

AIR FILTER ASSEMBLY

FIELD OF THE INVENTION

The present invention relates to an improved air filter assembly for use with an internal combustion engine and more particularly, to an air filter assembly that both facilitates replacement of an air filter element disposed therein, and that reduces noise associated with operation of the assembly.

BACKGROUND OF THE INVENTION

The use of air filter assemblies in vehicle engines, such as gasoline and diesel powered internal combustion engines, is well known. Such known air filter assemblies generally include an air filter housing that is designed to both attach to a portion of the engine intake system, and attach with an air filter element in a manner enabling filtering of intake air passed through the assembly and to the engine.

Such conventional air filter housing typically includes an air intake opening in air flow communication with fresh air, an air outlet opening in air flow communication with the engine intake system, and wherein the air filter element is interposed between the two openings. The air filter element is typically annular in shape, and is mounted in the air filter housing by a releasible attachment that passes through the air filter housing and that is attached to the engine.

A problem with such known air filter assemblies resides in the manner in which the air filter element is connected with the air filter housing. Particularly, known air filter assemblies do not provide a simple way of removing the air filter element, while at the same time providing a leak-tight seal therebetween. Additionally, the known air filter assemblies do not provide a construction that addresses the desire and/or need for meaningfully reducing the air intake noise associated with using the air filter assembly.

Another problem with conventional air filter assemblies is that they do provide a way for accessing the service life of the air filter, e.g., whether the air filter is clear or is close to being plugged. The only way of measuring air filter service life in such known air filters is to visually look at the filter itself, which can involve removing the air filter from the air filter housing and holding it up to a light source.

It is, therefore, desired that an air filter assembly be constructed in such a manner so as to provide a means for: (1) easily and simply removing and/or replacing the air filter element; (2) reducing the noise level of air passing through the assembly; and (3) indicating the level of service life left in the air filter element without having to visually inspect the air filter element itself. It is also desired that the assembly be configured in a manner that involves little or no modification to the engine intake system to accommodate its attachment and operation, thereby providing easy retrofit application.

SUMMARY OF THE INVENTION

Air filter assemblies of this invention are constructed in a manner that facilitates easy air filter removal that provides an air-tight seal between the housing and element, and that permits remaining filter element service life evaluation without having to remove or visually inspect the air filter element.

Air filter assemblies of this invention generally comprise an air filter housing having an air outlet section at one housing end that is adapted for connection to an engine intake system. The housing includes an internal member at an opposite housing end. The air outlet section and internal member have a generally annular configuration with an air flow passageway extending therethrough. The housing includes a connection flange that extends radially outwardly therefrom to permit attachment with an air filter member.

The assembly includes an air filter member attached to the housing. The air filter member comprises an annular air filter element having a wall section that is formed from a filter media. The air filter element is sized having an inside diameter larger than the housing internal member such that the housing internal member is disposed concentrically therein. The filter member has a closed top that is attached to one end of the air filter element. The top is positioned a distance away from an end of the internal member to provide an air flow space therebetween. A retaining band is disposed around an opposite end of the air filter element, and a connection base is positioned adjacent the retaining band and placed adjacent the housing connection flange.

The air filter assembly includes an attachment assembly that is positioned over the housing connection flange and air filter member connection base to releasibly attach the air filter member to the air filter housing. A sealing means is interposed between the air filter housing and air filter member to provide a leak-tight fit therebetween. The attachment assembly can be in the form of a clamp assembly designed to facilitate easy removal of the air filter member from the housing.

One or both of the air filter housing and the air filter member can include an air noise attenuation chamber disposed therein. Such air noise attenuation chamber is generally positioned along an air flow passageway in the assembly, and is formed from a wall surface having a number of openings disposed therethrough with a sound or noise attenuating material disposed within the chamber such that air passing over the wall surface can be exposed to the sound attenuating material via the openings.

Air filter assemblies of this invention can also include means for assessing the remaining service life of the air filter element without having to visually inspect or otherwise remove the air filter element from the assembly.

BRIEF DESCRIPTION OF THE DRAWINGS

FIG. 3 is an enlarged view of a connection and sealing means of the air filter assembly of FIGS. 1 and 2;

FIG. 4 is a perspective top plan view of a clasp assembly of the air filter assembly of FIGS. 1 and 2;

FIG. 5 is a side view of the clasp assembly of the air filer assembly of FIG. 4; and FIG. 6 is a cross-sectional side view along section 6—6 of the clasp assembly of FIG. 5.

DETAILED DESCRIPTION

Air filter assemblies of this invention comprise an air filter housing and a serviceable air filter member that are releasibly attached to each other by a clamp assembly. The air filter and/or the air filer housing includes a noise dampening section that is designed to control the level of air intake noise in the air filter assembly. Additionally, air filter assemblies of this invention can include means for monitoring the air filter service life without having to visually inspect the air filter element itself.

Figure 1:
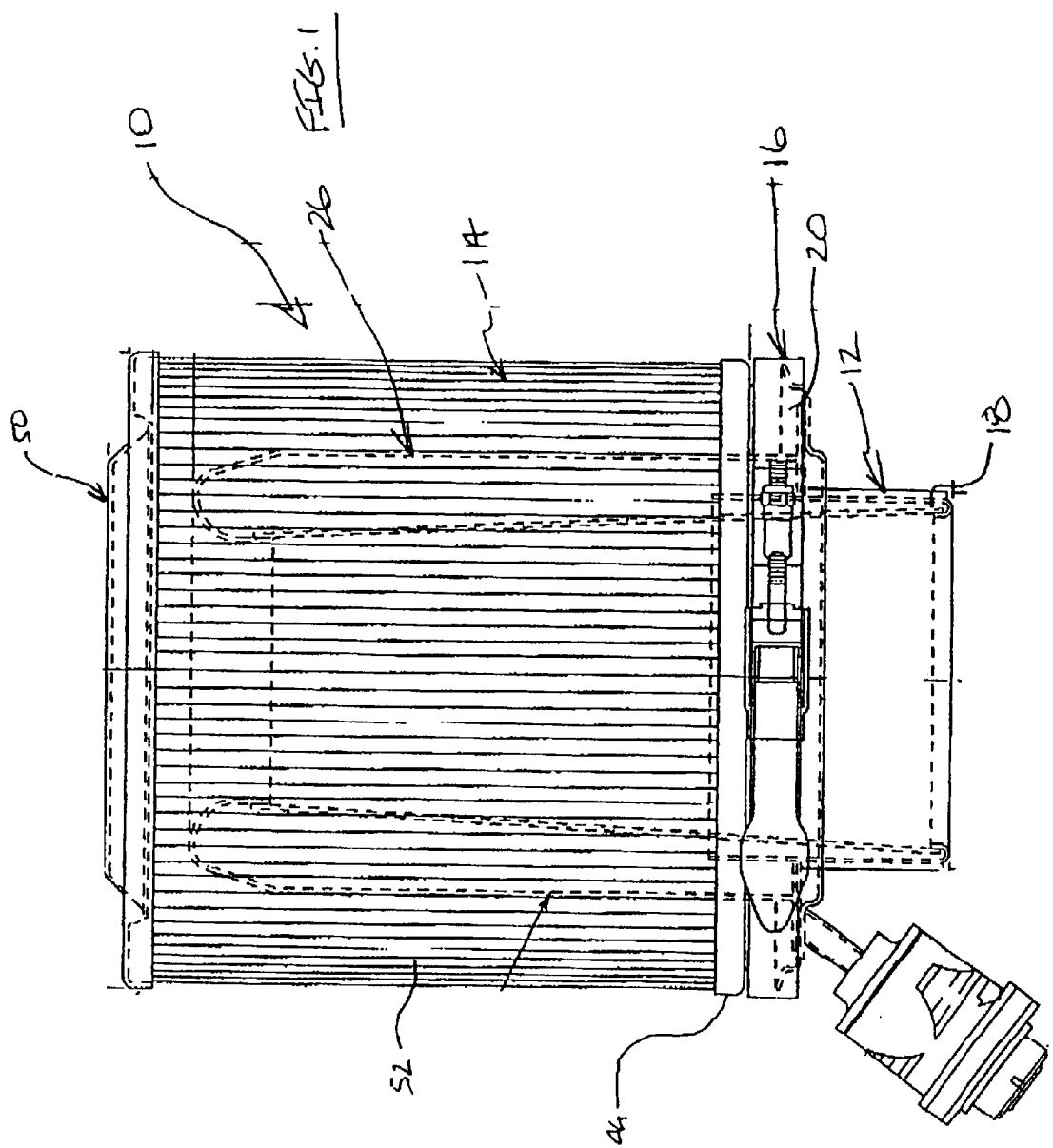
FIG. 1 is a perspective side elevational view, with partially hidden lines, of an air filter assembly constructed according to principles of this invention.

FIG. 1 shows an air filter assembly 10 of this invention comprising an air filter housing 12 that is releasibly attached to an air filter member 14 by a clasp assembly 16. The air filter housing 12 is generally cylindrical in shape and annular in construction. Moving upwardly along FIGS. 1 and 2, the housing 12 includes an air outlet section 18 that extends axially upwardly a distance to a connection flange 20 that extends radially outwardly from an outside surface of the housing a desired distance.

The air outlet section 18 is designed to connect with an air intake system member of an internal combustion engine to direct air received and filtered through the air filter member 14 to pass into the engine. The air outlet section 18 may comprise an annular chamber, formed between inside and outside concentric walls, and the inside wall surface may include a number of openings or perforations disposed therethrough. The annular chamber can include a noise deadening material disposed therein for the purposes of quieting the intake air noise, proximate the attached engine intake system member, associated with operating the engine.

The connection flange 20 is configured to provide a releasible attachment point with the air filter, to provide a leak-tight seal with the air filter, and to carry the air filter. The connection flange cooperatively engages an adjacent air filter connection base 22 and provides a leak-tight seal therewith by use of a sealing member 24 that is interposed therebetween. In an example embodiment, the sealing member 24 is in the form of an O-ring seal.

Moving axially upwardly from the connection flange 20, the air filter housing 12 includes an internal member 26 that extends a determined away from the flange. The internal member 26 has a generally cylindrical construction, and is sized having an outside diameter that is less than an inside diameter of the air filter to facilitate placement of the air filter thereover. The internal member has an annular chamber 28 that is formed between inner and outer walls.

In an example embodiment, the annular chamber 28 is filled with a noise attenuating, absorbing, suppressing and/or deadening material 30, and in inner wall 32 of the chamber includes a number of openings or perforations 34 disposed therethrough. The noise attenuating material 30 can be made from any material suitable for absorbing noise as air is passed thereover or therethrough. Suitable types of noise attenuating materials include those formed from paper, foam, fabric, polymer, or rubber materials. The perforations 34 operate to allow contact of filtered air passing through the air filter housing with the sound deadening material 30 within the internal member 26 for the purposes of effecting a desired noise silencing.

The exact size and configuration of the internal member can and will differ depending on the particular air filter assembly application and desired noise deadening result.

The air filter housing 12 is shown having the air outlet section 18, the connection flange 20, and the internal member 20 provided as one-piece assembly. The air filter housing 12 can be formed from conventional structurally suitable materials such as metal and the like, by conventional molding, machining, or fabricating methods.

In an example embodiment, the air filter assembly is formed from metal. In such example embodiment, the housing air outlet section 18 and internal member 26 are part of a first generally cylindrical subassembly that is formed from a first metal sleeve having a desired outside diameter. A desired sound deadening material is positioned along an inside surface of the sleeve, and a perforated second metal sleeve is positioned concentrically inside of the first metal sleeve to sandwich the sound deadening material therebetween. The ends of the first metal sleeve are rolled or otherwise configured to connect with the second metal sleeve ends to adjoin the two sleeves together.

A flange subassembly is attached around the cylindrical subassembly at a desired position by conventional methods, e.g., by welding or the like. As noted above, the flange subassembly comprises a surface that is configured to engage a complimentary mating surface of the air filter.

The housing air outlet section 18 and the internal member 26 together define an air flow passageway 24 that extends axially therethrough from a first housing end 36, at a terminal end of the air outlet section 18, to a second housing end 38, at a terminal end of the internal member 26. The air flow passageway 24 directs filtered air processed through the air filter 14 to the engine intake system for subsequent combustion. As mentioned above, the air filter housing includes the noise attenuating material disposed between the inner wall and the outer wall, which serves to absorb the noise of air traveling through the air flow passageway during operation of the engine.

Figure 2:
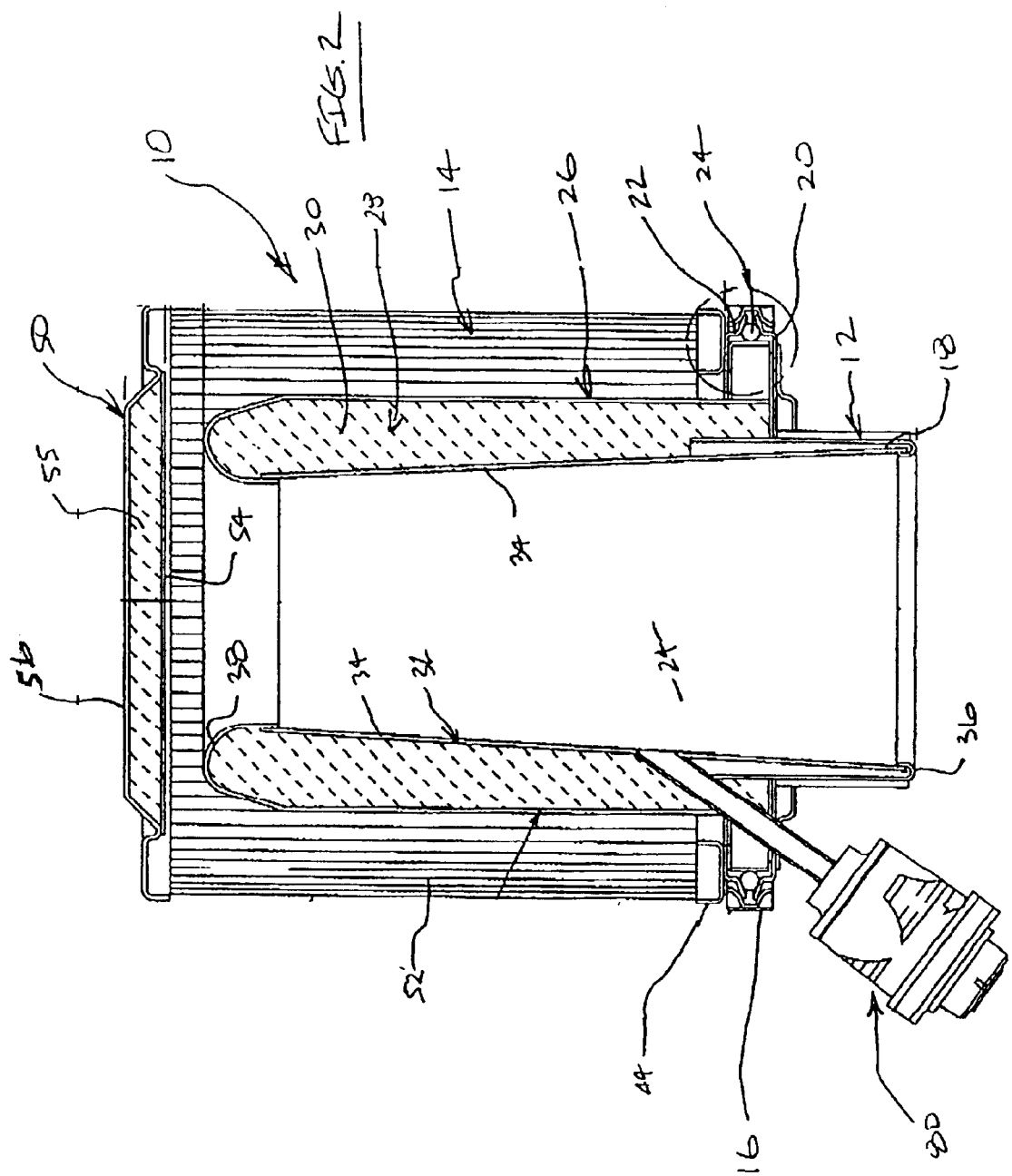
FIG. 2 is a fragmentary cross-sectional side view of the air filter assembly of FIG. 1.

In FIG. 2, the passageway 24 is having a slightly tapered diameter moving upwardly from the housing outlet section 12 to the internal member 20. Alternatively, the passageway can be configured having a substantially continuous diameter. The exact configuration of the passageway is understood to vary depending on the particular air filter assembly application.

FIG. 2 illustrates an enlarged view of the connection point (taken from FIG. 2) between the air housing and the air filter comprising the housing connection flange 20 disposed below the air filter connection base 22. More specifically, moving radially outwardly from the air filter housing, the connection flange 20 comprises a first substantially planar section 40, that is sized to accommodate placement of the air filter connection base thereover, and a second outwardly flared section 42, that is tapered at a desired angle to cooperate with an adjacent air filter connection base portion. In an example embodiment, the second outwardly flared section 42 is tapered and an angle of approximately 30 degrees relative to an axis running along the planar section 40.

The air filter member connection base 22 comprises, moving downwardly therealong, an air filter member retaining band 44, that is designed to accommodate an end of the air filter element therein, and an outwardly flared section 46, that is tapered at a desired angle to cooperate with the flared section 42 of the air filter housing connection flange 20. In an example embodiment, the connection base 22 outwardly flared section 46 is tapered and an angle of approximately 30 degrees relative to an axis running along a base of the air filter element retaining band 44. The connection base 22 also includes an axially extending section 48 that projects axially away from the retaining band 44, and that is positioned radially inwardly of the outwardly flared section 46.

As illustrated in FIG. 3, the axially extending section 48 serves to provide a backside surface again which the O-ring seal 24 abuts. Configured in this manner, once the air filter member and air filter housing are brought into adjoining contact with one another, the outwardly flared sections 42 and 46 (of the respective air filter housing connection flange 20 and air filter member connection base 22) operate to both trap the O-ring seal therebetween to form a leak-tight seal, and operate to form an outer surface geometry that can be held together by a desired clasp assembly 16.

Although the invention embodiment described and illustrated above relates to a connection point between the air filter member and air filter housing having a symmetric outside surface configuration, it is to be understood that other differently configured connection points can be designed and used in the spirit of this invention. A key feature is that the connection point between the air filter member and air filter housing be one that is both capable of forming a leak-tight seal between the two, and that is capable of being releasibly attached by a relatively simple or easy to operate attachment means.

In the example embodiment, the connection point, formed between the air filter member and air filter housing, has a symmetric outside configuration that is provided in the form of two tapered surface that are converging inwardly towards one another, thereby forming a V-shaped cross-sectional profile. The structural features of the connection point will be better appreciated after the structure of the air filter member 14 has been described.

Referring back to FIGS. 1 and 2, the air filter member 14 is designed for placement over the air filter housing 12. The air filter member comprises a disk-shaped top 50, a retaining band 44 disposed opposite the top, and an annular air filter element 52 positioned between the top and retaining band. The filter element 56 comprises a wall section that is formed from a desired filter material capable of filtering air before it is directed through the air filter housing and into the engine. The filter material can be formed from conventional materials suitable for removing air-borne particulate matter from the air such as various types of paper material, polymeric fiber material, foam materials, and combinations thereof.

The top 50 and the retaining band 44 serve as retaining elements to secure the opposite ends of the side wall and filter material. The top 50 is closed and functions as a lid to form a leak-tight seal with an end of the filter element 52. The retaining band 44 is an annular member that is configured to accommodate the opposite end of the filter element therein, and that has an open inside diameter that is sized and configured to allow placement over the air filter housing internal member 26. The top 50 has an interior surface 54 that is directed inwardly towards an inside diameter of the filter element. When mounted onto the air filter housing, the air filter member top interior surface 54 is directed towards the second end 38 of the air filter housing such that filtered air passing through the air filter element is directed towards the top interior surface before being routed through the air filter housing air flow passageway 24.

In an example embodiment, the air filter member top 52 is designed, similar to that if the air filter housing, to attenuate or silence noise that occurs during operation of the air filter assembly to filter air for subsequent intake into the engine. More specifically, the top 52 is constructed having a noise attenuating material 55, similar to that discussed above for the air filter housing, disposed between the interior surface 54 and a closed exterior surface 56. Furthermore, the top interior surface 54 is constructed is similar to that of the housing inner member wall 32, having number of openings or perforations disposed therethrough designed in size and number to permit filtered air passing from the filter element to enter the top interior surface 54 and contact and/or pass through the noise attenuating material 55. Thereby, operating to silence the noise of air flow passing through the air filter member.

Referring back to FIG. 3, when combined together in the manner noted above, the connection point formed between the air filter member and air filter housing has a V-shaped cross-sectional geometry. Constructed in this manner, a clamp assembly 16 in the form of a V-band clamp is used to releasibly attach the air filter member and air filter housing together. The V-band clamp 16 is a generally annular member having an inner mounting surface 58 that is in the form of two inwardly-converging tapered members that are configured in the shape of a V to fit over the outside surfaces of the air filter member connection base and air filter housing connection flange outwardly flared sections 46 and 42, respectively. The clamp includes an outer member 60 that is connected to the inner mounting surface 58, and that defines an outside surface of the clamp.

The clamp inner mounting surface 58 is sized and shaped so that, when drawn tightly over the air filter member and air filter housing surfaces, it operates to draw the connecting members of the air filter member and air filter housing closer together, thereby squeezing the O-ring seal therebetween a desired amount to ensuring formation of the desired leak-tight seal therebetween.

As shown in FIG. 1, the air filter member is releasibly attached to the air filter housing by the clamp assembly 16. When the engaging surface of the air filter member is cooperatively engaged with the connection member of the air filter housing, the clamp assembly is mounted around these engaged surfaces in order to ensure that the air filter member and air filter housing do not lose its air-tight seal or become separated.

FIGS. 4 to 6 illustrate features of the clamp assembly in greater detail. The clamp assembly 16 comprises a generally circular band, having a first end 62 and a second end 64, that is joined together by a handle or clasp 66. The clasp 66 allows the diameter of the band to expand and contract depending on its position, e.g., depending on whether the clasp is opened or closed. The clamp inner mounting surface 58 is disposed along an inside diameter of the band, and the clamp outer member 60 is disposed around an outside diameter of the clamp.

When the clamp assembly is positioned around the air filter housing and air filter member, it can be placed in either a locked or unlocked position to secure or release the joining of the air filter member and air filter housing. The clasp 66 comprises a cantilever mechanism that operates to change the ring diameter clamp, expanding or contracting the diameter of the ring, to provide an open/unlocked or closed/locked position. The clasp 66 comprises a first member 68 in the form of a cantilever handle 68 that is attached adjacent the band first end 62, and second member 70 that is attached adjacent the band second end 64. The clasp 66 further includes a threaded member 72 that is attached to and that projects from the first member 68. The threaded member 72 extends through an opening in the clasp second member 70, and a nut 74 is threadably engaged with the threaded member to hold it into place.

The clamp assembly 16 is used to releasibly attach the air filter member and housing together by: (1) operating the cantilever mechanism to expand the clamp band diameter; (2) placing the now expanded clamp assembly over the connection point between the air filter member and housing, ensuring cooperative placement over each mating connection section; and (3) operating the cantilever mechanism to contract the clamp band diameter to draw the air filter member and housing tightly together and form a desired leak-tight fit therebetween. Configured in this manner, the air filter assembly enables quick and easy removal and attachment of the air filter member, from the air filter housing for needed maintenance or service.

The clamp assembly can also include means for locking the clamp assembly into a closed position. Such locking means can be in the form of a removable pin or the like placed through the clamp assembly when it is in the closed position to make sure it does not open accidentally. Alternatively, the locking means can be in the form of any type of mechanism or assembly that operates to prevent or resist the unwanted opening of the clamp member once it has been closed into place.

When the clamp assembly is in the locked position, the air filter assembly 10 is fully assembled and ready for attachment to the engine for operation. The outlet section 18 is secured to the air intake portion of the engine by conventional means, e.g., by threaded clamp-type attachment. While the engine is operating, a vacuum is created within the air flow passageway of the air filter housing that draws air through the air filter element. The air filter element removes unwanted airborne particulate matter from the air. The filtered air is drawn upwardly within the air filter assembly over the end of the housing internal member 26, at which point the filtered air is directly through the air flow passageway 24 and into the engine intake system.

The air filter assembly of this invention meaningfully reduces the noise associated with the air intake operation of the engine due to the specially configured housing inner member wall 32 and the filter member top interior surface 54, both of which having the noise attenuating material disposed therein to absorb/attenuate the noise of air traveling along their paths. While an air filter assembly of this invention has been described and illustrated having the noise attenuating feature in each of the air filter housing and air filter member, it may be that the assembly comprises such a feature in only one of the air filter housing or element. Placement of the noise attenuating feature in the assembly will ultimately depend on the particular air filter assembly application.

Referring back to FIG. 2, air filter assemblies of this invention can also include a monitoring valve 80, which allows the degree of air filtration restriction within the assembly to be monitored. The degree of air filtration restriction reflects the condition of the air filter element and the amount of air that is able to pass through the filter element, thereby providing an indication of whether or not the air filter element needs to be replaced. More specifically, the monitoring valve 80 measures the amount of vacuum within the air filter assembly, particularly between the air filter housing and the air filter member, during operation of the engine.

The monitoring valve 80 is attached to a measuring/indicating device configured to provide a signal indicating when a preset degree of vacuum is measured in the air filter assembly. As the air filter element becomes plugged, the amount of vacuum registered by the monitoring valve increases, and when the preset degree of vacuum is reached, a signal is sent from the monitoring device indicating that the air filter element needs to be replaced. Configured in this manner, the air filter assembly of this invention enables one to assess the remaining service life of the air filter element without having to physically remove the air filter element for visual inspection.

In addition to the specific features and embodiments described above, it is understood that the present invention includes all equivalents to the structures described herein, and is not to be limited to the disclosed embodiments. For example, the sizing and configuration of the air filter housing and air filter member can be varied depending on the needs of the user. Individuals skilled in the art to which the present air filter assembly pertains will understand that variations and modifications to the embodiments described can be used beneficially without departing from the scope of the invention.

What is claimed is:

1. An air filter assembly comprising:
   an air filter housing comprising:
      an air outlet section at one housing end adapted for connection to an engine intake system;
      an internal member at an opposite housing end, the air outlet section and internal member having an annular configuration with an air flow passageway extending therethrough; and
      a connection flange extending radially outwardly therefrom;
   an air filter member attached to the housing and comprising:
      an annular filter element having a filter media disposed along a wall section and having an inside diameter larger than the housing internal member, the internal member being disposed concentrically within the wall section;
      a closed top attached to one end of the filter element, the top being disposed a distance away from an end of the internal member to provide an air flow space therebetween; a retaining band disposed around an opposite end of the air filter element; and
      a connection base positioned adjacent the retaining band and placed adjacent the housing connection flange;
   an attachment assembly positioned over the connection flange and connection base to releasibly attach the air filter member to the air filter housing.

2. The air filter assembly as recited in claim 1 further comprising a sealing means interposed between the air filter housing and air filter member to provide a leak-tight seal therebetween.

3. The air filter assembly as recited in claim 2 wherein the sealing means is an O-ring seal interposed between the connection flange and the connection base.

4. The air filter assembly as recited in claim 1 further comprising means for attenuating air noise within the air filter housing.

5. The air filter assembly as recited in claim 4 wherein the means for attenuating air noise comprises an air attenuation chamber disposed within one or both of the outlet section and internal member, the chamber being positioned along an inside diameter wall forming the air flow passageway, the chamber including a number of openings disposed through the wall and comprising a noise attenuating material disposed within the chamber.

6. The air filter assembly as recited in claim 1 further comprising means for attenuating air noise within the air filter member.

7. The air filter assembly as recited in claim 6 wherein the means for attenuating air noise comprises an air attenuation chamber disposed within the top, the chamber being positioned along an inside top surface and including number of openings disposed therethrough and comprising a noise attenuating material disposed within the chamber.

8. The air filter assembly as recited in claim 1 wherein the attachment assembly is an expandable/contractible clamp, the connection flange and connecting base together form a V-shaped connection point, and wherein the clamp has a V-shaped internal clamping surface for cooperation therewith.

9. The air filter assembly as recited in claim 1 further comprising means for monitoring the air filter element service life.

10. The air filter assembly as recited in claim 9 wherein the means for monitoring measures the amount of vacuum within the assembly during air filter assembly operation.

11. An air filter assembly comprising:
   an air filter housing comprising:
      an air outlet section at one housing end adapted for connection to an engine intake system;
      an internal member at an opposite housing end, the air outlet section and internal member having an annular configuration with an air flow passageway extending therethrough; and
      a connection flange extending radially outwardly therefrom;
   an air filter member attached to the housing and comprising:
      an annular filter element having a filter media disposed along a wall section and having an inside diameter larger than the housing internal member, the internal member being disposed concentrically within the annular filter;
      a closed top attached to one end of the air filter element, the top being disposed a distance away from an end of the internal member to provide an air flow space therebetween;
      a retaining band disposed around an opposite end of the air filter element; and
      a connection base positioned adjacent the retaining band and placed adjacent the housing connection flange thereby forming a connection point;
      an elastomeric sealing means interposed between the connection flange and connection base to provide a leak-tight seal therebetween;
      a clamp assembly positioned over the connection point to releasibly attach the air filter member to the air filter housing; and
      means for attenuating air noise within the assembly, the means for attenuating being disposed within the assembly.

12. The air filter assembly recited in claim 11 wherein the sealing means is an O-ring seal.

13. The air filter assembly as recited in claim 11 wherein the means for attenuating air noise comprises an air attenuation chamber disposed within one or both of the outlet section and internal member, the chamber being positioned along an inside diameter wall forming the air flow passageway, the chamber including a number of openings disposed through the wall and comprising a noise attenuating material disposed within the chamber.

14. The air filter assembly as recited in claim 11 wherein the means for attenuating air noise comprises an air attenuation chamber disposed within the top, the chamber being positioned along an inside top surface and including number of openings disposed therethrough and comprising a noise attenuating material disposed within the chamber.

15. The air filter assembly as recited in claim 11 wherein the clamp assembly is in the form of an expandable/contractible band, the connection point between the air filter housing and air filter member having a V-shaped cross-section, the band having a V-shaped internal clamping surface for cooperation therewith.

16. The air filter assembly as recited in claim 11 further comprising means for monitoring the filter element service life.

17. The air filter assembly as recited in claim 16 wherein the means for monitoring measures the amount of vacuum within the assembly during air filter assembly operation.

18. An air filter assembly comprising:
   an air filter housing comprising:
      an air outlet section at one housing end adapted for connection to an engine intake system;
      an internal member at an opposite housing end, the air outlet section and internal member having an annular configuration with an air flow passageway extending therethrough, the internal member including an air noise attenuation chamber formed along a wall surface having a number of openings disposed therein and a noise attenuating material disposed within the chamber; and
      a connection flange extending radially outwardly therefrom;
   an air filter member attached to the housing and comprising:
      an annular air filter element formed from a filter media disposed along a wall section and having an inside diameter larger than the housing internal member, the internal member being disposed concentrically within the annular air filter element;
      a closed top attached to one end of the air filter element, the top being disposed a distance away from an end of the internal member to provide an air flow space therebetween; a retaining band disposed around an opposite end of the air filter element; and
      a connection base positioned adjacent the retaining band and placed adjacent the housing connection flange thereby forming a connection point;
      an O-ring seal interposed between the connection flange and connection base to provide a leak-tight seal therebetween; and
      a clamp assembly positioned over the connection point to releasibly attach the air filter member to the air filter housing.

19. The air filter assembly as recited in claim 18 further comprising a noise attenuating chamber disposed within the air filter member, the chamber being positioned along an inside top surface and including a number of openings disposed therethrough and comprising a noise attenuating material disposed within the chamber.

20. The air filter assembly as recited in claim 18 wherein the clamp assembly comprises an expandable/contractible band having a cantilever latching mechanism, the connection point between the air filter housing and air filter member having a V-shaped cross-section, the band having a V-shaped internal clamping surface for cooperation therewith.

21. The air filter assembly as recited in claim 18 further comprising means for monitoring the air filter element service life.

22. The air filter assembly as recited in claim 21 wherein the means for monitoring measures the amount of vacuum within the assembly during air filter assembly operation.

* * * * *